United States Patent [19]
Kato et al.

[11] Patent Number: 6,020,971
[45] Date of Patent: Feb. 1, 2000

[54] INFORMATION PROCESSING SYSTEM AND PROGRAM STORAGE DEVICE READ BY THE SYSTEM

[75] Inventors: Tokunori Kato, Ichinomiya; Hiromi Mori; Norihiko Asai, both of Nagoya, all of Japan

[73] Assignee: Brother Kogyo Kabushiki Kaisha, Nagoya, Japan

[21] Appl. No.: 08/928,631

[22] Filed: Sep. 12, 1997

[30] Foreign Application Priority Data

Sep. 20, 1996 [JP] Japan ................................. 8-271768

[51] Int. Cl.$^7$ ........................................ G06F 15/00
[52] U.S. Cl. ............................ 358/1.14; 358/1.12
[58] Field of Search ................................. 395/101, 105, 395/106, 109, 111, 112, 113, 114, 115, 200.3, 200.31, 200.62, 200.78; 358/437, 443, 448, 296, 408, 409; 345/329, 335, 333; 399/75, 76, 91, 38; 347/5, 111, 128

[56] References Cited

U.S. PATENT DOCUMENTS

| | | | |
|---|---|---|---|
| 5,021,892 | 6/1991 | Kita et al. ........................... | 358/468 |
| 5,694,529 | 12/1997 | Fromherz ........................... | 395/114 |
| 5,727,135 | 3/1998 | Webb et al. ........................ | 395/113 |
| 5,802,257 | 9/1998 | Kato ................................... | 395/106 |
| 5,850,573 | 12/1998 | Wada .................................. | 710/62 |

FOREIGN PATENT DOCUMENTS

0575168 A1  12/1993  European Pat. Off. .

*Primary Examiner*—Dov Popvici
*Assistant Examiner*—Gabriel I. Garcia
*Attorney, Agent, or Firm*—Oliff & Berridge, PLC

[57] ABSTRACT

An information processing system has a first information processing apparatus and a second information processing apparatus, which are connected to each other, for performing an information process by controlling, from the first information processing apparatus, the second information processing apparatus to perform the information process. The information processing system is provided with: an inquiring device contained in the first information processing apparatus for inquiring an information processing function in the second information processing apparatus of the second information processing apparatus, in advance of performing the information process. The information processing system is also provided with: a function setting device contained in the first information processing apparatus for performing a function setting for the information processing function in the second information processing apparatus from the first information processing apparatus when performing the information process, on the basis of an inquired result by the inquiring device.

28 Claims, 8 Drawing Sheets

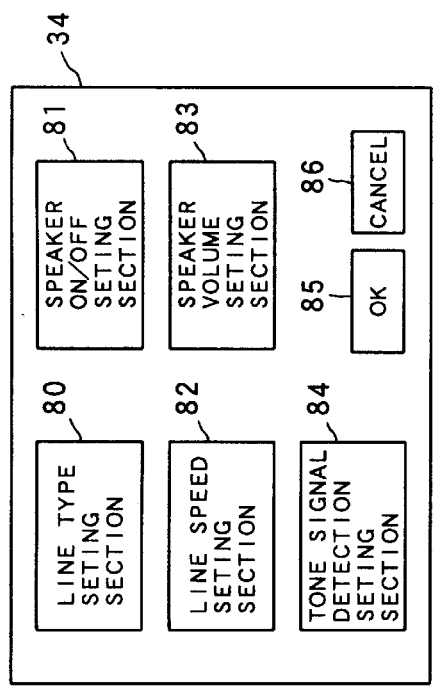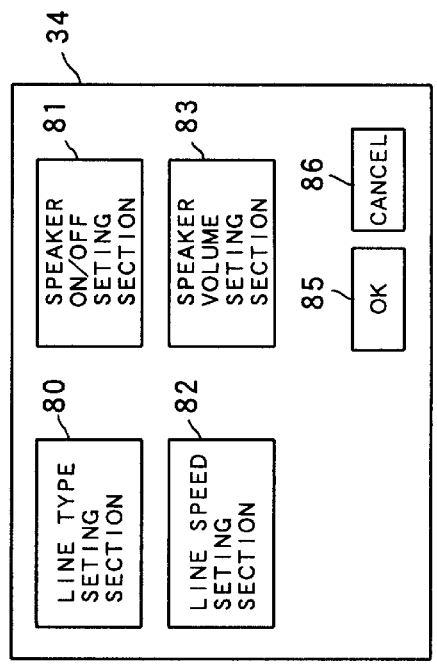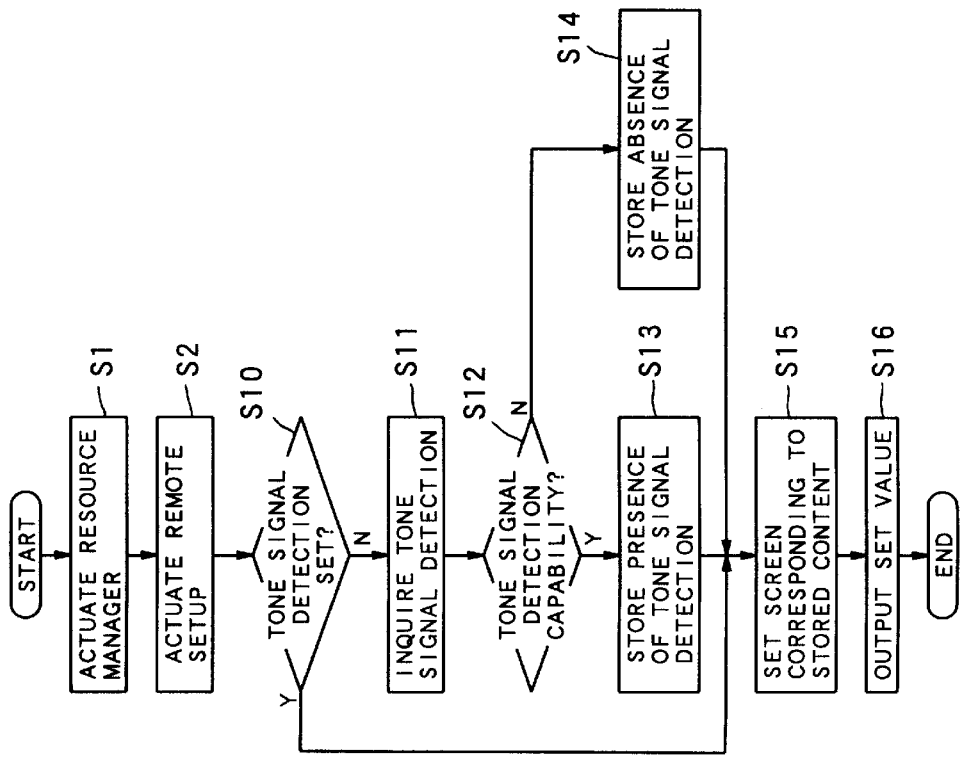

INFORMATION PROCESSING SYSTEM AND PROGRAM STORAGE DEVICE READ BY THE SYSTEM

BACKGROUND OF THE INVENTION

1. Field of the Invention

The present invention generally relates to a technical field of an information processing system for controlling, from an information processing apparatus such as a computer or the like, a plurality of other information processing apparatuses, such as a scanner, a printer, a facsimile and the like, to thereby perform the information processes suitable for the other information processing apparatuses.

2. Description of the Related Art

There is an information processing system in which a plurality of information processing apparatuses, such as a scanner, a printer, a facsimile and the like, are controlled by an information processing apparatus such as a computer or the like, to thereby perform the information processes.

In this type of information processing system, for the sake of such a configuration that one computer controls various types of information processing apparatuses, it is necessary to perform function settings corresponding to respective information processing apparatuses as targets for the control by the computer.

For example, not only the function setting is required when the information processing apparatus as the target for the control is changed from the scanner to the printer, but also the function setting is required again when the information processing apparatus as the target for the control is changed from one type of scanner to another type of scanner which have different reading functions from each other even if both of them are the scanners.

However, when connecting many information processing apparatuses to one computer to thereby perform the information processes, there may be such a case that the change of the function setting is frequently required. This results in a problem that an operability becomes complex and unusable, since a user of the computer must check a type of the information processing apparatus as the target for the control each time when performing the function setting.

In order to solve this problem, an information processing system may be proposed in which the function setting on the computer side is automated. However, in this case, in case of connecting the scanner to the computer for example, if preparing a control program of the computer to finely switch over between the function settings for different types of scanners to the computer, the program becomes complex. This results in a problem that vast times and labors are spent to prepare the control program. In this case, even if the information processing apparatuses as the targets for the control themselves are the same kind (e.g., the scanner), when countries where the information processing apparatuses are installed are different from each other, the function settings of the information processing apparatuses are also different between respective countries, such as a detection of a tone signal on a telephone line, for example. If individually preparing the control programs so as to deal with the usage conditions of the respective information processing apparatuses in order to control all of the information processing apparatuses by use of one computer, the complexity is further increased.

On the other hand, if trying to deal with various kinds of information processing apparatuses by use of one control program, there may happen such a case that the function settings of the computer do not meet with the functions of processing the information in the information processing apparatuses. This results in a problem that the user of the computer may be confused.

SUMMARY OF THE INVENTION

The present invention is proposed from the viewpoint of the above mentioned problems. It is therefore an object of the present invention to provide an information processing system and a program storage device readable by the information processing system, which enables one computer to control various types of information processing apparatuses as targets for the control while information processing functions of the information processing apparatuses always meet with function settings of the computer.

The above object of the present invention can be achieved by an information processing system having a first information processing apparatus such as a personal computer or the like and a second information processing apparatus such as a multiple-functional peripheral apparatus or the like, which are connected to each other, for performing an information process by controlling, from the first information processing apparatus, the second information processing apparatus to perform the information process. The information processing system is provided with: an inquiring device such as a setup controller or the like contained in the first information processing apparatus for inquiring an information processing function in the second information processing apparatus of the second information processing apparatus, in advance of performing the information process; and a function setting device such as a scanner controller, a printer controller, a facsimile controller, a setup controller or the like, contained in the first information processing apparatus for performing a function setting for the information processing function in the second information processing apparatus from the first information processing apparatus when performing the information process, on the basis of an inquired result by the inquiring device.

According to the information processing system, the information processing function in the second information processing apparatus is inquired of the second information processing apparatus, in advance of performing the information process, by the inquiring device contained in the first information processing apparatus. Then, the function setting for the information processing function in the second information processing apparatus is performed from the first information processing apparatus when performing the information process, on the basis of an inquired result by the inquiring device, by the function setting device contained in the first information processing apparatus.

Therefore, it is possible to perform the function setting from the first information processing apparatus in harmonization with the information processing function in the second information processing apparatus. Further, even if the specification or the like for the information processing function in the second information processing apparatus is changed, it is still possible to adapt the information processing function in the second information processing apparatus to the function setting in the first information processing apparatus.

Consequently, it is possible to prevent a user from being confused and perform the information process efficiently, while performing the information process in a condition where the function in the first information processing apparatus is adapted to the function in the second information processing apparatus.

In one aspect of the information processing system, the system is further provided with a memory device such as an external memory or the like contained in the first information processing apparatus for storing a content of the function setting, and performs the information process by controlling the second information processing apparatus from the first information processing apparatus on the basis of the stored content of the function setting.

According to this aspect, the content of the function setting is stored into the memory device contained in the first information processing apparatus. Then, the information process is performed by controlling the second information processing apparatus from the first information processing apparatus on the basis of the stored content of the function setting.

Therefore, it is not necessary to inquire the information processing function and perform the function setting again after performing the function setting once.

Consequently, it is possible to speed up the information process in the first information processing apparatus once the function setting is performed.

In another aspect of the information processing system, the second information processing apparatus is provided with a scanner device for reading information. The first information processing apparatus is provided with a computer for processing the information read by the scanner device. The information processing function in the second information processing apparatus is an information reading function of the scanner device. And that, the function setting for the information processing function corresponds to a reading capability of the information reading function.

According to this aspect, the reading capability of the scanner device is inquired in advance of performing the scanning process, by the inquiring device contained in the computer. Then, the function setting for the information reading function of the scanner device is performed from the computer on the basis of the inquired result.

Therefore, it is possible to control the scanner device from the computer, in such a condition that the computer is adapted to the reading capability of the scanner device, to thereby read out the information.

In another aspect of the information processing system, the second information processing apparatus is provided with a communicating device connected through a telephone line to the external for sending and receiving information to and from an external device. The first information processing apparatus is provided with a computer for performing a process of sending and receiving the information. The information processing function in the second information processing apparatus is a detecting function for detecting a tone signal inputted through the telephone line of the communicating device. And that, the function setting for the information processing function corresponds to a presence or absence of the detecting function.

According to this aspect, the presence or absence of the detecting function for detecting the tone signal in the communicating device is inquired in advance of performing the communicating process, by the inquiring device contained in the computer. Then, the function setting for the detecting function of the communicating device is performed from the computer on the basis of the inquired result.

Therefore, it is possible to control the communicating device from the computer, in such a condition that the computer is adapted to the presence or absence of the detecting function in the communicating device, to thereby send and receive the information to and from the communicating device.

In another aspect of the information processing system, the second information processing apparatus is provided with a printer device for heating and fixing toners transferred on a record sheet corresponding to information to be recorded by using a heater to thereby record the information. The first information processing apparatus is provided with a computer for performing a process of outputting to the second information processing apparatus the information to be recorded. The information processing function in the second information processing apparatus is a switching function for switching the heater in the printer device to an unused state. And that, the function setting for the information processing function corresponds to a switching timing when the heater is switched to the unused state by the switching function.

According to this aspect, the switching timing of the heater in the printer device is inquired in advance of performing the printing process, by the inquiring device contained in the computer. Then, the function setting for the switching function of the printer device is performed from the computer on the basis of the inquired result.

Therefore, it is possible to control the printer device from the computer, in such a condition that the computer is adapted to the switching timing of the heater in the printer device, to thereby record the information onto the record sheet.

In this aspect, the second information processing apparatus may be provided with a timing information memory device for storing preset switching timing information indicative of the switching timing. And that, the first information processing apparatus outputs error information when the switching timing, which is inconsistent with the stored switching timing information, is set in the function setting, and further outputs re-setting information to prompt a re-setting of the switching timing in the first information processing apparatus.

Accordingly, the preset switching timing information is stored into the timing information memory device. Then, the error information is outputted by the first information processing apparatus when the switching timing, which is inconsistent with the stored switching timing information, is set in the function setting. Further, the re-setting information to prompt the re-setting of the switching timing is outputted by the first information processing apparatus.

Therefore, in case that the switching timing inconsistent with the stored switching timing information is set, it is possible for the user to recognize this inconsistency and speedily perform the re-setting.

In the above described information processing system in each aspect, the inquiring device may inquire the information processing function of the second information processing apparatus only once, before performing the information process.

Accordingly, since the information processing function is inquired only once by the inquiring device before performing the information process, it is possible to set the number of times of inquiring to be the minimum number, and it is also possible to promptly perform the information process.

The above object of the present invention can be also achieved by a program storage device readable by a computer in an information processing system having the computer and an information processing apparatus, which are connected to each other, for performing an information process by controlling, from the computer, the information processing apparatus to perform the information process, tangibly embodying a program of instructions executable by the computer to perform method processes for performing the information process. The method processes are provided with: inquiring an information processing function in the information processing apparatus of the information processing apparatus, in advance of performing the information process, by an inquiring device contained in the computer; and performing a function setting for the information processing function in the information processing apparatus from the computer when performing the information process, on the basis of an inquired result by the inquiring device, by a function setting device contained in the computer.

According to the program storage device, such as a flexible disk, a CD-ROM, a DVD-ROM, a ROM, a floppy disk or the like, of the present invention, the above described information processing system of the present invention can be realized as the computer reads the program of instructions from the program storage device, and executes the read program to control the information processing apparatus.

In one aspect of the program storage device, the method processes are further provided with: storing a content of the function setting into a memory device contained in the computer; and performing the information process by controlling the information processing apparatus from the computer on the basis of the stored content of the function setting.

In another aspect of the program storage device, the information processing apparatus is provided with a scanner device for reading information. The computer processes the information read by the scanner device. The information processing function in the information processing apparatus is an information reading function of the scanner device. And that, the function setting for the information processing function corresponds to a reading capability of the information reading function.

In another aspect of the program storage device, the information processing apparatus is provided with a communicating device connected through a telephone line to the external for sending and receiving information to and from an external device. The computer performs a process of sending and receiving the information. The information processing function in the information processing apparatus is a detecting function for detecting a tone signal inputted through the telephone line of the communicating device. And that, the function setting for the information processing function corresponds to a presence or absence of the detecting function.

In another aspect of the program storage device, the information processing apparatus is provided with a printer device for heating and fixing toners transferred on a record sheet corresponding to information to be recorded by using a heater to thereby record the information. The computer performs a process of outputting to the information processing apparatus the information to be recorded. The information processing function in the information processing apparatus is a switching function for switching the heater in the printer device to an unused state. And that, the function setting for the information processing function corresponds to a switching timing when the heater is switched to the unused state by the switching function.

In this aspect, the method processes may be further provided with: storing preset switching timing information indicative of the switching timing into a timing information memory device contained in the information processing apparatus; outputting error information by the computer when the switching timing, which is inconsistent with the stored switching timing information, is set in the function setting; and outputting re-setting information to prompt a re-setting of the switching timing in the computer by the computer.

In the above described program storage device in each aspect, the inquiring process may inquire the information processing function of the information processing apparatus only once, before performing the information process.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 6A is a flowchart showing a second example of the initial function setting operation of the embodiment, FIG. 6B is a plan view of the display screen showing one example of the picture plane according to the second example of the initial function setting operation, FIG. 6C is a plan view of the display screen showing another example of the picture plane according to the second example of the initial function setting operation.

DETAILED DESCRIPTION OF THE PREFERRED EMBODIMENT

Next, a preferred embodiment of the present invention is explained with reference to the drawings. In the embodiment explained below, the present invention is applied to an information processing system, in which a personal computer is connected to a multiple-functional peripheral apparatus having: a printer function of recording information to be record onto a predetermined record sheet; a scanner function of reading information such as image or the like; a copier function of recording information or the like read by the scanner function; and a facsimile function of sending and receiving the information or the like through a telephone line to and from the external, and the multiple-functional peripheral apparatus is controlled from the personal computer, so as to perform the information processes, such as recording of the information, reading of the information, sending and receiving the information to and from the external and the like.

(I) Whole Configuration of Information Processing System

At first, a whole configuration and appearance of the information processing system to which the present invention is applied is explained with reference to FIG. 1.

As mentioned above, an information processing system S as an embodiment is provided with: a multiple-functional peripheral apparatus 1 having a facsimile function, a printer function, a copier function and a scanner function, respectively; and a personal computer 30 connected to the multiple-functional peripheral apparatus 1.

Figure 1:
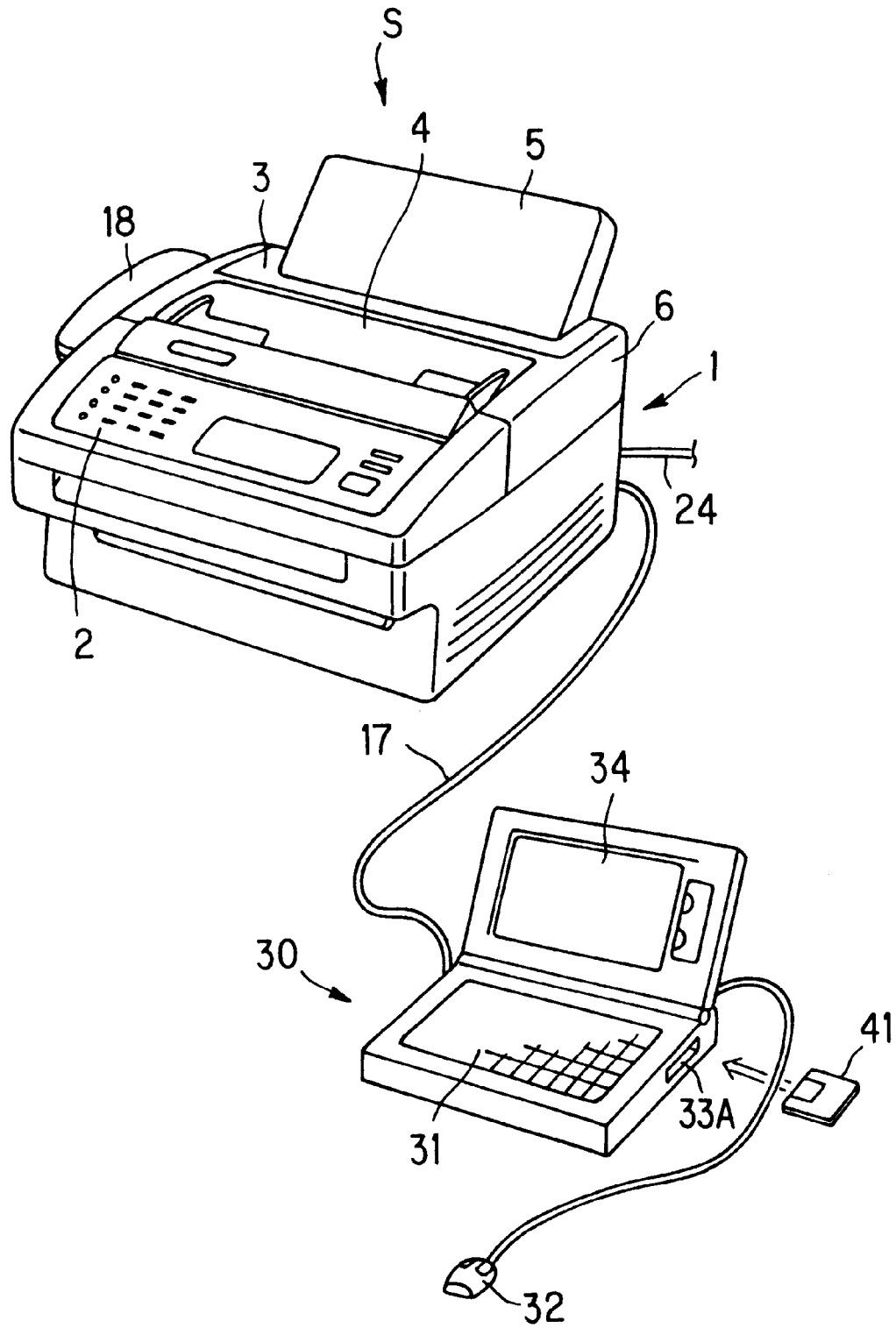
FIG. 1 is a perspective view showing a whole configuration of an information processing system as an embodiment of the present invention.

In this configuration, as shown in FIG. 1, a telephone receiver 18 described later is disposed at a side portion of a main body 6 of the multiple-functional peripheral apparatus 1, and an operation panel 2 is disposed on a front portion of a top surface of the main body 6. A cassette mounting section 3 for detachably mounting a record sheet cassette 5 for holding the record sheets is disposed on an upper portion of a rear surface of the main body 6. An original sheet accommodating portion 4 for maintaining an original sheet to be read by the scanner function is disposed on a center of the top surface of the main body 6. Further, the multiple-functional peripheral apparatus 1 is connected through a telephone line 24 to the external, so that the facsimile function can be performed by using the telephone line 24.

On the other hand, the personal computer 30 for controlling the multiple-functional peripheral apparatus 1 having the above mentioned configuration is implemented as a normal computer. Then, as shown in FIG. 1, the personal computer 30 is provided with: a keyboard 31 for inputting various information; a mouse 32 for clicking (selecting) an icon, a button or the like described later; a flexible disk drive device 33A for reading out, from a flexible disk 41 as one example of a program storage device on which various control programs described later are recorded; and a display unit 34 consisting of a liquid crystal display device or the like for example, to display picture planes including various kinds of function setting picture planes on a screen thereof described later. The personal computer 30 is connected through a connection cable 17 to the multiple-functional peripheral apparatus 1.

The above mentioned "icon" graphically represents an application program corresponding to each of processes described later by using a predetermined picture displayed on the screen of the display unit 34. A desired application program can be selected and executed by click-processing (i.e. selection-execution-processing) one of the icons, which indicates the desired application program, by using the mouse 32, the key board 31 or the like.

The above mentioned "button" is to graphically display, in a function setting at the time of executing a predetermined application program or the like, the respective function setting processes (e.g., a confirmation, a cancel or the like) on the screen of the display unit 34. The desired function setting process is executed by click-processing one of the buttons, which corresponds to the desired function setting process, with the mouse 32, the keyboard 31 or the like. Normally, the button itself is represented as an icon.

(II) Multiple-functional Peripheral Apparatus

Next, an inner configuration and an operation of the multiple-functional peripheral apparatus 1 is explained with reference to FIG.2.

Figure 2:
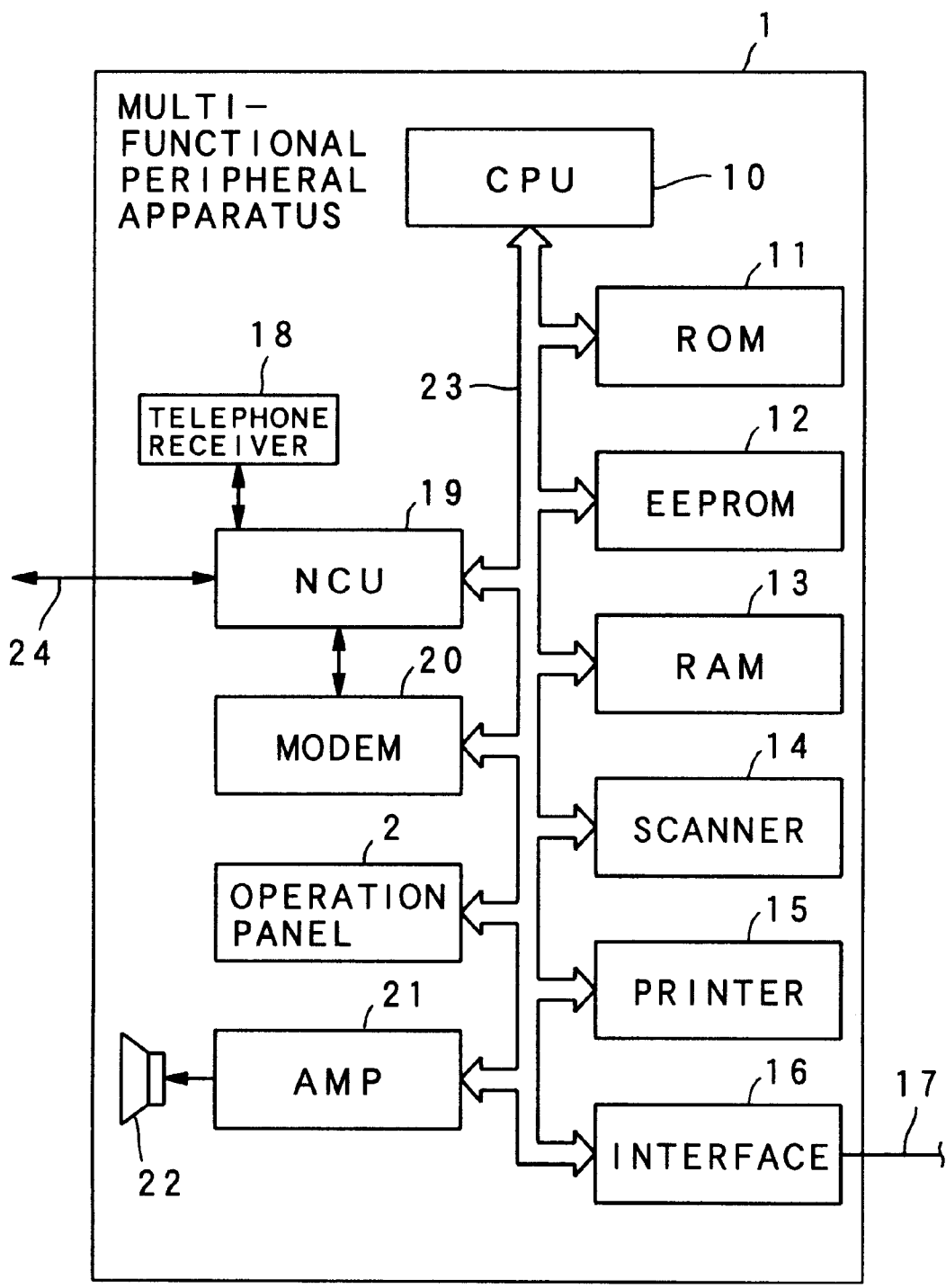
FIG. 2 is a block diagram showing a schematic inner configuration of a multiple-functional peripheral apparatus in the embodiment.

As shown in FIG.2, the multiple-functional peripheral apparatus 1 is provided with: a CPU (Central Processing Unit) 10; a RON (Read Only Memory) 11; an EEPROM (Electrically Erasable and Programmable Read Only Memory) 12 as one example of a timing information memory device; a RAM (Random Access Memory) 13; a scanner 14; a printer 15; an interface 16; the telephone receiver 18; an NCU (Network Control Unit) 19 as one example of a communicating device; a modem 20; the operation panel 2; an amplifier (AMP) 21; a speaker 22; and a communication bus 23.

Next, operations at the above mentioned respective sections of the multiple-functional peripheral apparatus 1 are explained.

The NCU 19 outputs facsimile information inputted through the telephone line 24 to the modem 20, and also outputs voice information inputted through the telephone line 24 to the telephone receiver 18. Moreover, the NCU 19 sends out the information, which is outputted from the modem 20 and is to be facsimile-transmitted, to the telephone line 24, and further sends out the voice information generated by the telephone receiver 18 to the telephone line 24.

The modem 20 performs so-called modulating and demodulating operations. More concretely, the modem 20 demodulates the facsimile information inputted from the NCU 19, and then outputs a digital signal corresponding to the facsimile information to the bus 23. Further, the modem 20 modulates the facsimile information from the bus 23 to thereby output it to the NCU 19.

The scanner 14 reads information such as image or the like to be facsimile-transmitted, and outputs it to the bus 23 under the control of the CPU 10 when the multiple-functional peripheral apparatus 1 services as a facsimile apparatus. Alternatively, the scanner 14 reads the information such as image or the like to be copied, and outputs it to the bus 23 under the control of the CPU 10 when the multiple-functional peripheral apparatus 1 services as a copier apparatus.

The printer 15 receives the facsimile information, which is inputted from the NCU 19 and the modem 20, through the bus 23 directly from the modem 20 or from the RAM 13 after the inputted facsimile information is temporarily stored in the RAM 13, and records the received facsimile information onto the record sheet under the control of the CPU 10 when the multiple-functional peripheral apparatus 1 services as a facsimile device. The printer 15 receives the information such as image or the like to be copied through the bus 23, which is inputted from the scanner 14, and records the received information onto the record sheet when the multiple-functional peripheral apparatus 1 services as a copier device. The printer 15 receives the information through the bus 23, which is inputted from the personal computer 30, and records the received information onto the record sheet when the multiple-functional peripheral apparatus 1 services as a printer device.

The operation panel 2 indicates a command operation or a state to instruct a command to the multiple-functional peripheral apparatus 1 or set a predetermined state.

The ROM 11 is a memory dedicated to a readout operation, which is intended to store the control program to implement the facsimile function, the scanner function, the printer function, the copier function and the like which are mainly executed by the CPU 10. The ROM 11 outputs the necessary data and the like through the bus 23 under the control of the CPU 10.

The EEPROM 12 is a non-volatile type memory, which is intended to store information which must not be erased even if a power supply of the multiple-functional peripheral apparatus 1 is turned off, for example, telephone numbers of destinations frequently used for the facsimile communication when the multiple-functional peripheral apparatus 1 services as the facsimile device, telephone numbers for so-called abbreviation telephone numbers or the like. Moreover, this EEPROM 12 stores a maximum value of a sleep time of a heater in the printer 15 which is set in advance, as described later in detail, in accordance with a situation of a country where the multiple-functional peripheral apparatus 1 is installed.

The RAM 13 is a random access memory to perform an operation of temporarily storing the necessary data, under the control of the CPU 10. More concretely, the RAM 13 temporarily stores: the data inputted through the telephone line 24, the NCU 19 and the like as the facsimile information; the facsimile information to be sent through the telephone line 24 to the external; the information read by the scanner 14; and so on. The information in the RAM 13 is read out at a predetermined timing under the control of the CPU 10.

The interface 16 inputs the data and the like, which are sent from the personal computer 30 connected through the connection cable 17, to the multiple-functional peripheral apparatus 1. The interface 16 also performs an interface operation to convert the information in one data format, which is to be outputted from the multiple-functional peripheral apparatus 1 to the personal computer 30, to the information in another data format for the personal computer 30.

The amplifier 21 amplifies audio information, such as a call tone, a guidance voice or the like, to be outputted from the speaker 22 to thereby output it to the speaker 22, under the control of the CPU 10.

Finally, the CPU 10 controls the respective operations of the above mentioned components on the basis of the control program stored in the RON 11, through the bus 23.

(III) Personal Computer

Next, a configuration and a schematic operation of the personal computer 30 are explained with reference to FIG.3.

Figure 3:
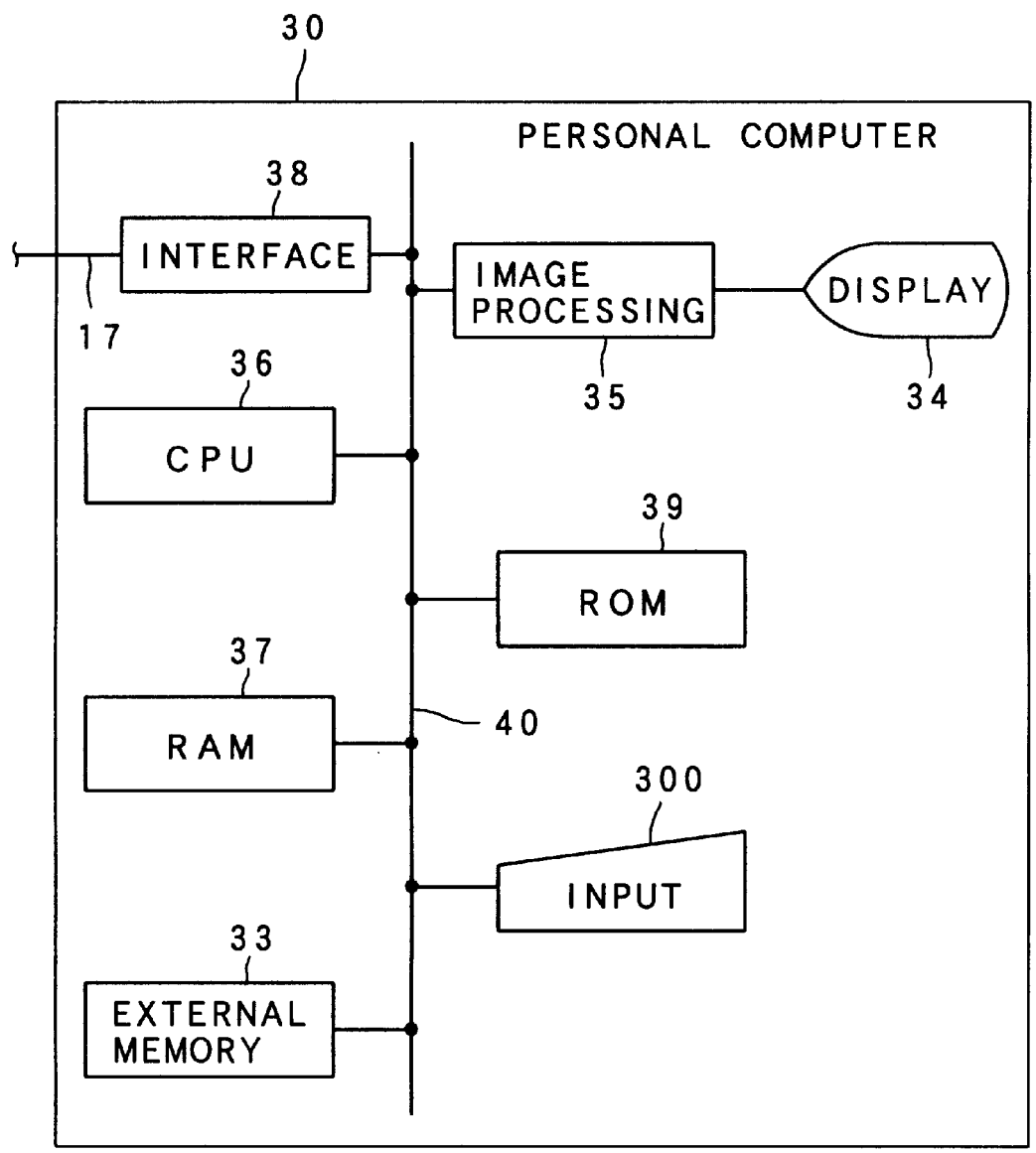
FIG. 3 is a block diagram showing a schematic inner configuration of a personal computer in the embodiment.

As shown in FIG.3, the personal computer 30 of the embodiment is provided with: a CPU 36; a ROM 39; a RAM 37; an input section 300 containing the keyboard 31 and the mouse 32; an image processing section 35; the display unit 34; an interface 38; a bus 40; and an external memory 33. The personal computer 30 is connected through the connection cable 17 to the multiple-functional peripheral apparatus 1.

In this configuration, the CPU 36 mainly performs a control process and the like of the present embodiment shown in a later described flowchart.

The control program of controlling the respective components of the personal computer 30 is stored in advance in the ROM 39. The control program is outputted through the bus 40 to the CPU 36 when it is requested by the CPU 36 as the occasion demands.

The RAM 37 temporarily stores the data associated with the control process described later, and then outputs the data through the bus 40 and the interface 38 to the multiple-functional peripheral apparatus 1, under the control of the CPU 36, as the occasion demands.

The image processing section 35 performs an image synthesis and the like to indicate the necessary data together with a button described later, and outputs the processed result to the display unit 34 under the control of the CPU 36, so that the display unit 34 displays the data, the icon and the like on the screen.

The input section 300 including the mouse 32 and the keyboard 31 selects the displayed data and further actuates the icon displayed on the display unit 34 and the like to thereby input the necessary data for the control process and the like through the bus 40 to the CPU 36, the RAM 37 and the like.

The interface 38 outputs the transmission data outputted through the bus 40 under the control of the CPU 36, to the multiple-functional peripheral apparatus 1 through the connection cable 17, and further outputs the reception data inputted from the multiple-functional peripheral apparatus 1 through the connection cable 17, onto the bus 40.

The external memory 33 includes an HDD (Hard Disk Drive) device and the flexible disk drive device 33A shown in FIG. 1. A control program corresponding to the control process shown in flowcharts described later is stored (installed) in advance in the HDD device for the sake of the communication process in the CPU 36. Then, processes such as a process of are performed as the occasion demands, in accordance with the request from the CPU 36. In parallel to this, the external memory 33 stores the data and the like, as necessary, under the control of the CPU 36.

Through the bus 40, the respective components, such as the CPU 36, the ROM 39, the RAM 37, the external memory 33 and the like, are connected to each other, and the data is transmitted therebetween through the bus 40.

Figure 4:
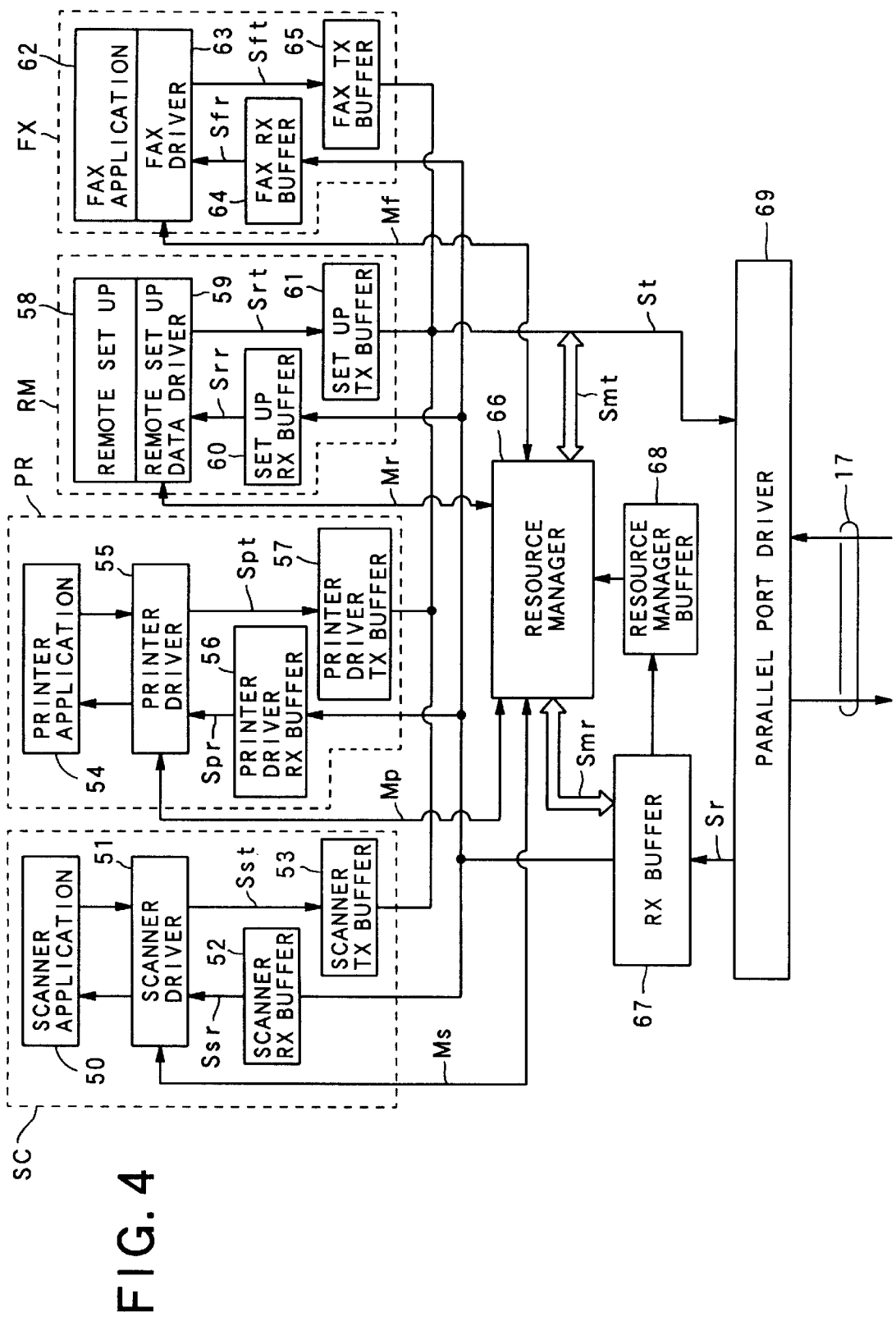
FIG. 4 is a block diagram showing a functional configuration of the personal computer in the embodiment.

Next, detailed configurations of the CPU 36 and the external memory 33 in the personal computer 30 are explained with reference to FIG. 4. FIG. 4 shows the flow of the data and the operation in the personal computer 30 when the multiple-functional peripheral apparatus 1 is controlled by using the personal computer 30, as a function block diagram showing respective operations. As for a scanner application portion 50, a printer application portion 54, a remote setup portion 58, a facsimile application portion 62 and a resource manager portion 66, the respective functions are actually performed, as a calculation processing section within the CPU 36 is actuated in accordance with an application program corresponding to each of the scanner application portion 50 and the like which are especially stored (installed) in the UDD device of the external memory 33.

As shown in FIG. 4, in case that the multiple-functional peripheral apparatus 1 is remotely controlled from the personal computer 30, the personal computer 30 is provided with: a scanner controller SC serving as a function setting device for controlling the CPU 10 and the scanner 14 to perform an information reading function in the multiple-functional peripheral apparatus 1; a printer controller PR servicing as a function setting device for controlling the CPU 10 and the printer 15 to perform an information recording function in the multiple-functional peripheral apparatus 1; a setup controller RM servicing as an inquiring device and a function setting device for performing initial settings and the like of the CPU 10, the scanner 14, the printer 15 and so on in the multiple-functional peripheral apparatus 1; a facsimile controller FX servicing as a function setting device for controlling the CPU 10, the NCU 19 and the scanner 14 or the printer 15 to perform the facsimile function in the multiple-functional peripheral apparatus 1; the resource manager portion 66; a reception buffer 67; a resource manager buffer 68; and a parallel port driver 69.

The scanner controller SC is provided with: the scanner application portion 50; a scanner driver 51; a scanner reception (RX) buffer 52; and a scanner transmission (TX) buffer 53.

The printer controller PR is provided with: the printer application portion 54; a printer driver 55; a printer driver reception (RX) buffer 56; and a printer driver transmission (TX) buffer 57.

The setup controller RN is provided with: the remote setup portion 58; a remote setup data driver 59; a setup reception (RX) buffer 60; and a setup transmission (TX) buffer 61.

The facsimile controller FX is provided with: the facsimile application portion 62; a facsimile driver 63; a facsimile reception (RX) buffer 64 and a facsimile transmission (TX) buffer 65.

In the above mentioned logical configurations, the respective buffers are physically contained within the RAM 37.

The parallel port driver 69 is physically constructed within the interface 38.

Next, schematic operations in the respective sections are explained.

At first, the operation of the scanner controller SC is explained.

The scanner reception buffer 52 contained in the scanner controller SC temporarily stores a scanner reception data Ssr extracted and assigned thereto by a reception management process in the later described resource manager portion 66 from among the data received from the multiple-functional peripheral apparatus 1 (including the information read by the scanner 14 of the multiple-functional peripheral apparatus 1) to thereby output it to the scanner driver 51. Identification information (ID information flag), which indicates the scanner reception data Ssr, is appended to the scanner reception data Ssr by the resource manager portion 66. Then, the scanner driver 51 applies a predetermined process to the scanner reception data Ssr to thereby output the processed data to the scanner application portion 50. When receiving it, the scanner application portion 50 stores the received scanner reception data Ssr into the external memory 33 and further actuates a so-called viewer application program and the like to display the read information so as to display it on the display unit 34.

On the other hand, prior to the processes in the scanner application portion 50 and the like, the data, which is used to control the scanner 14 and is outputted by the scanner application portion 50 in case that the scanner function is to be performed, is outputted as a scanner transmission data Sst from the scanner driver 51, and is temporarily stored into the scanner transmission buffer 53. Then, the scanner transmission data Sst read out from the scanner transmission buffer 53 is formed into packets by a transmission management process by the resource manager portion 66, as described later. A flag indicative, which indicates the scanner transmission data Sst, is appended to the scanner transmission data Sst. Then, it is sent through the parallel port driver 69 to the multiple functional peripheral apparatus 1, and is used for the operation control in the scanner 14.

At this time, a remote setup process including an inquiring process described later is performed as a premise of the operation of the scanner controller SC.

Next, the operation of the printer controller PR is explained.

The printer driver reception buffer 56 contained in the printer controller PR temporarily stores a printer reception data Spr extracted and assigned thereto by the reception management process in the later described resource manager portion 66 from among the data received from the multiple-functional peripheral apparatus 1 (including the data indicative of a state of the record process at the printer 15 of the multiple-functional peripheral apparatus 1) to thereby output it to the printer driver 55. An ID information flag, which indicates the printer reception data Spr, is appended to the printer reception data Spr by the resource manager portion 66. Then, in accordance with the printer reception data Spr, the printer driver 55 displays a presently operational situation of the printer 15 on the display unit 34, or gives a necessary communication notice to the printer application portion 54. When receiving it, the printer application portion 54 performs a predetermined process corresponding to the printer application.

On the other hand, prior to the processes in the printer application portion 54 and the like, the data, which is used to control the printer 15 and is outputted in case that the printer function is to be performed by the printer application portion 54, and the data, which is to be recorded by the printer 15, are outputted as a printer transmission data Spt from the printer driver 55. The outputted printer transmission data Spt is temporarily stored into the printer transmission buffer 57. Then, the printer transmission data Spt read out from the printer transmission buffer 57 is formed into packets by the transmission management process by the resource manager portion 66, as described later. A flag, which indicates the printer transmission data Spt, is appended to the printer transmission data Spt. Then, it is sent through the parallel port driver 69 to the multiple-functional peripheral apparatus 1. Thus, the operation at the printer 15 is controlled.

At this time, the remote setup process including the inquiring process described later is performed as a premise of the operation in the printer controller PR.

Next, the operation of the facsimile controller FX is explained.

The facsimile reception buffer 64 contained in the facsimile controller FX temporarily stores a facsimile reception data Sfr extracted and assigned thereto by the reception management process in the later described resource manager portion 66 from among the data received from the multiple-functional peripheral apparatus 1 (including the information received through the telephone line 24 by the NCU 19 of the multiple-functional peripheral apparatus 1) to thereby output it to the facsimile driver 63. An ID information flag, which indicates the facsimile reception data Sfr, is appended to the facsimile reception data Sfr by the resource manager portion 66. Then, the facsimile driver 63 applies a predetermined process to the facsimile reception data Sfr to thereby output it to the facsimile application portion 62. When receiving it, the facsimile application portion 62 stores the facsimile reception data Sfr into the external memory 33, and further actuates a log manager application program of managing a transmission and reception history of the facsimile information and the like so as to display the received log etc. on the display unit 34.

On the other hand, the data and the control data, which are to be facsimile-transmitted and are outputted from the facsimile application portion 62 in case that the facsimile function is to be performed, are inputted to the facsimile driver 63. Then, a predetermined process is applied to these data and control data, so that they become a facsimile transmission data Sft and are temporarily stored into the facsimile transmission buffer 65. Then, the facsimile transmission data Sft read out from the facsimile transmission buffer 65 is formed into packets by the transmission management process in the resource manager portion 66, as described later. A flag, which indicates the facsimile transmission data Sft, is appended to the facsimile transmission data Sft. Then, it is sent through the parallel port driver 69 to the multiple-functional peripheral apparatus 1, and is facsimile-transmitted through a facsimile function section of the multiple-functional peripheral apparatus 1 composed of the NCU 19, the modem 20 and the like.

At this time, the remote setup process including the inquiring process described later is performed as a premise of the operation in the facsimile controller FX.

Next, the operation of the setup controller RM is explained.

As mentioned above, the setup controller RM is intended to remotely perform various initial function settings in the multiple-functional peripheral apparatus 1 from the personal computer 30, prior to the operations of the scanner controller SC, the printer controller PR and the facsimile controller FX. In these operations, the setup reception buffer 60 contained in the setup controller RM temporarily stores a setup reception data Srr extracted and assigned thereto by the reception management process in the later described resource manager portion 66 from the data received from the multiple-functional peripheral apparatus 1 (including the setting complete information at the initialization in the multiple-functional peripheral apparatus 1) to thereby output it to the remote setup data driver 59. An ID information flag, which indicates the setup reception data Srr, is appended to the setup reception data Srr by the resource manager portion 66. Then, the remote setup data driver 59 applies a predetermined process to the setup reception data Srr to thereby output it to the remote setup portion 58. When receiving it, the remote setup portion 58 performs a process for the initial function settings in the multiple-functional peripheral apparatus 1, as described later, in accordance with the setup reception data Srr.

On the other hand, the data, which is outputted from the remote setup portion 58 and is used for the process for the initial function settings in the multiple-functional peripheral apparatus 1, is outputted as a setup transmission data Srt by the remote setup data driver 59, and is temporarily stored into the setup transmission buffer 61. Then, the setup transmission data Srt read out from the setup transmission buffer 61 is formed into packets by the transmission management process in the resource manager portion 66, as described later, and a flag, which indicates the setup transmission data Srt, is appended. Then, it is sent through the parallel port driver 69 to the multiple-functional peripheral apparatus 1, and the initial function setting is performed.

Incidentally, the inquiring process exemplified later is contained in the process for the initial function settings.

Next, the operations of the resource manager portion 66, the reception buffer 67 and the resource manager buffer 68 when the respective controllers are actuated are explained.

At first, the reception management process in the resource manager portion 66 is explained.

An implementation of sending and receiving the data between the personal computer 30 and the multiple-functional peripheral apparatus 1 in this embodiment is schematically explained. When sending and receiving the data between the personal computer 30 and the multiple-functional peripheral apparatus 1 in this embodiment, the data is formed into packets and separated into: data for the scanner 14 (related to the scanner controller SC); data for the printer 15 (related to the printer controller PR); data for the facsimile function composed of the NCU 19 etc. (related to the facsimile controller FX); and data for the initial function setting (related to the setup controller RM). Namely, one type of data is contained in one packet. A header, in which a data amount descriptor indicating the data amount of the data included in each packet and the identification flag indicating the type of the data included in each packet (i.e., the identification flag which indicates any one of the data related to the scanner controller SC, the data related to the printer controller PR, the data related to the facsimile controller FX and the data related to the setup controller RM) are described, are appended to the head portion of each packet.

The resource manager portion 66 identifies a content of the header of each packet in the reception data Sr, which is received through the parallel port driver 69 and is temporarily stored in the reception buffer 67, in accordance with the packet data, when receiving the data from the multiple-functional peripheral apparatus 1. Then, the resource manager portion 66 separates the stored reception data SR into: the scanner reception data Ssr related to the scanner controller SC; the printer reception data Spr related to the printer controller PR; the facsimile reception data Sfr related to the facsimile controller FX; and the setup reception data Srr related to the setup controller RM, to thereby output them in time sequence. In this reception management process, the resource manager portion 66 sends and receives a management message Smr to and from the reception buffer 67 to thereby perform the reception management process.

On the other hand, in the transmission management process by the resource manager portion 66, each of the scanner transmission data Sst, the printer transmission data Spt, the facsimile transmission data Sft and the setup transmission data Srt sent from the respective controllers is divided for each predetermined data amount into the packets. Then, the identification flag for each data is outputted as a management message Smt by the resource manager portion 66. Thus, the identification flag is appended at the header of each packet. Then, the respective packets are re-arranged in time series, and are outputted as the transmission data St to the parallel port driver 69.

In the operation of the resource manager portion 66, the resource manager buffer 68 temporarily stores the data necessary for the resource manager portion 66 at the time of the reception management process, and outputs it to the resource manager portion 66 at a predetermined timing.

The parallel port driver 69 receives the reception data Sr from the multiple-functional peripheral apparatus 1 and outputs it to the reception buffer 67 and further outputs the transmission data St to the multiple-functional peripheral apparatus 1.

As mentioned above, by performing the transmission management process and the reception management process for the packet data by the resource manager portion 66, for example, it is possible to simultaneously execute the facsimile receiving function and the function of the scanner 14 or the printer 15 (actually in a time multiplexed manner). Thus, for example, simultaneous operations in which, while the data received by facsimile is inputted to the personal computer 30, the data outputted from the personal computer 30 is printed out, are possible in the multiple-functional peripheral apparatus 1.

Next, some examples of the initial function setting operation corresponding to each of the respective controllers are explained.

(IV) First Initial Function Setting Operation (Remote Setup Process)

At first, an example of the initial function setting operation corresponding to the scanner controller SC is explained with reference to FIGS. 5A, 5B and 5C. This first example of the initial function setting operation described below is performed by the setup controller RM for the scanner controller SC. Normally, this example of the initial function setting operation is performed only once immediately after the application software corresponding to the scanner controller SC and the setup controller RM is installed into the HDD device of the external memory 33 or the like.

Figure 5A:
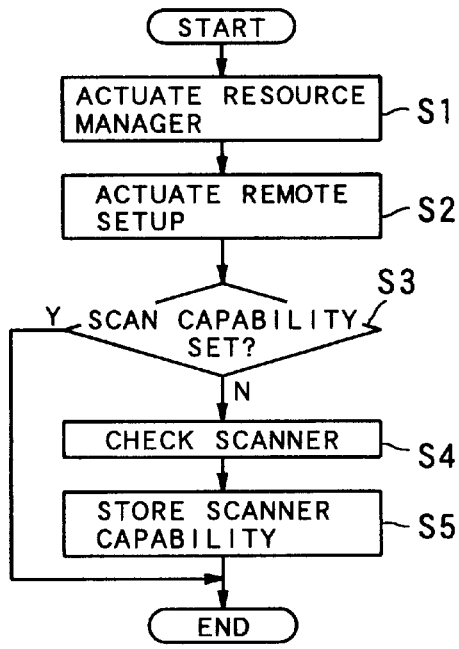
FIG. 5A is a flowchart showing a first example of an initial function setting operation of the embodiment.

As shown in a flowchart of FIG. 5A, in the first example of the initial function setting operation by the setup controller RM corresponding to the scanner controller SC, at first the resource manager portion 66 is actuated (Step S1). Next, the setup controller RM containing the remote setup portion 58 is actuated (Step S2). At the time of actuating the setup controller RM, after the command data for checking the setup from the remote setup data driver 59 is stored into the setup transmission buffer 61, such a setup message Mr as "THERE IS THE TRANSMISSION DATA" is outputted to the resource manager portion 66. When receiving it, the resource manager portion 66 sends the command data within the setup transmission buffer 61 to the multiple-functional peripheral apparatus 1, so as to inquire whether or not the setup process is possible. Further, when an answer in response to this inquiry (whether or not the setup process is possible) is received, the resource manager portion 66 stores the data indicative of the answered content into the setup reception buffer 60. After that, the resource manager portion 66 outputs such a setup message Mr as "THERE IS RECEPTION DATA" to the remote setup data driver 59 so as to notify it to take in the data indicative of the answered content.

Next, it is judged whether or not the information as for the capability (e.g., the resolution and the like) of the scanner 14 is set and stored in the HDD device (Step S3). If it is set and stored (Step S3; YES), the process is ended. If it is not stored (Step S3; NO), a command data to check the capability of the scanner 14 is outputted from the remote setup data driver 59 through the resource manager portion 66 to the multiple-functional peripheral apparatus 1, in the similar manner as the command data for checking the setup. Then, the capability, such as the resolution and the like which the scanner 14 has, is inquired (Step S4). Then, the inquired result i.e. the scanner capability is written to a predetermined file on the HDD device of the external memory 33 (Step S5), and the process is ended.

Next, an actual setting process in the scanner controller SC after the initial function setting operation in the setup controller RM is completed is explained with reference to a flowchart shown in FIG.5B.

Figure 5B:
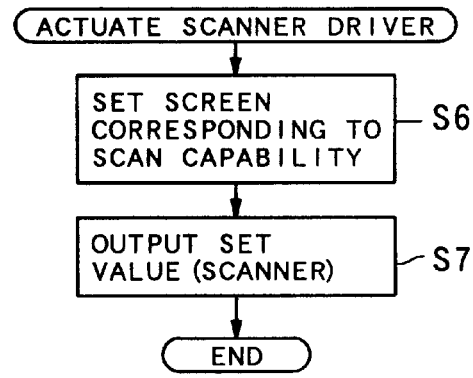
FIG. 5B is a flowchart showing a function setting operation after the initial function setting operation in FIG. 5A.

As shown in FIG. 5B, when the scanner function is to be actually performed after the initial function settings (at the steps S1 to S5) are completed, at first the scanner driver 51 is actuated by the scanner application portion 50. Then, a picture plane to set the condition under which the scanner 14 functions by using the inquired result stored in the HDD device, i.e., a picture plane to set the function of the scanner 14 is displayed on the screen of the display unit 34 (Step S6). After that, the function setting of the scanner 14 is performed on the screen of the display unit 34. The command data for setting the scanner condition corresponding to the set function is transmitted from the scanner driver 51 to the multiple-functional peripheral apparatus 1 (Step S7). Accordingly, the scanner operation corresponding to the function is performed.

Next, an example of the picture plane on the screen to set the function of the scanner 14 (in case that the above mentioned inquiry is as for a reading capability of the scanner 14) is explained with reference to FIG. 5C.

Figure 5C:
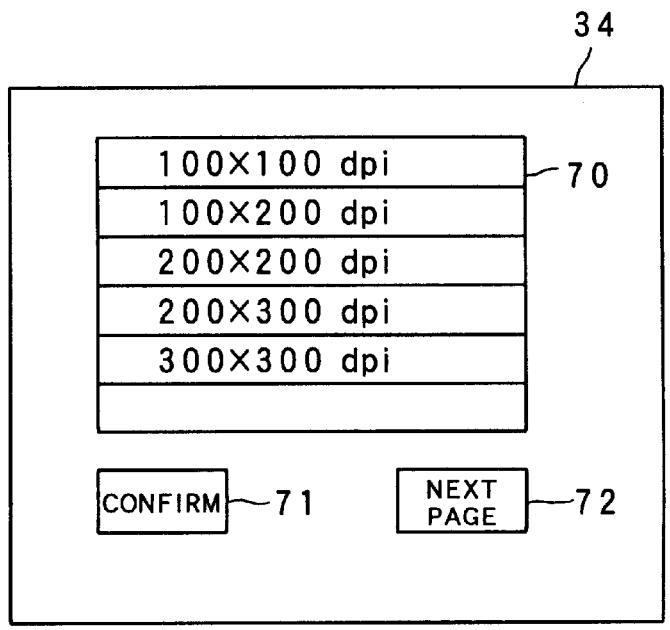
FIG. 5C is a plan view of a display screen showing one example of a picture plane according to the first example of the initial function setting operation.

As shown in FIG. 5C, since the reading capability of the scanner 14 known from the inquiry is already recorded on the HDD device (Step S5), the reading capability based thereon is displayed as a display 70 on the screen of the display unit 34. In a case shown in FIG. 5C, the reading capability of the scanner 14 can be selected from 5 types of: (1) 100×100 dpi (dot per inch), (2) 100×200 dpi, (3) 200×200 dpi, (4) 200×300 dpi and (5) 300×300 dpi. When a user selects a desirable resolution from the display 70 and actuates (hereinafter, referred to as "click") a confirm bottom 71 to confirm the scan execution by using the mouse 32, a scan start command as well as the information indicating the selected resolution is outputted as a scanner transmission data Sst to the multiple-functional peripheral apparatus 1. Accordingly, the resolution of the scanner 14 is set to the selected resolution, and thereby the information is read at this resolution.

Incidentally, a next page button 72 shown in FIG. 5C is a button clicked when a next picture plane is intended to be seen, if selection branches for the resolution of the scanner 14 cannot be simultaneously displayed within the display 70.

According to the first example of the initial function setting operation, the information can be read by the scanner 14 in the condition suitable for the reading capability of the scanner 14, by controlling the scanner 14 from the personal computer 30.

(V) Second Initial Function Setting Operation

Next, an example of the initial function setting operation corresponding to the facsimile controller FX is explained with reference to FIGS. 6A, 6B and 6C. This second example of the initial function setting operation described below is performed by the setup controller RM, and is performed only once immediately after the application software corresponding to the facsimile controller FX and the setup controller RM is installed into the HDD device of the external memory 33 and the like.

In the second example of the initial function setting operation, it is inquired in the initial function setting operation whether or not the function setting is performed in the multiple-functional peripheral apparatus 1 to detect a tone signal (a busy tone signal, such interrupting tones as "TSU, TSU, . . . ", transmitted when a facsimile destination is busy or when a line is cut off by the facsimile destination, or a dial tone signal, such consecutive tones as "TSUU", transmitted at a time of a line start) from the telephone line 24 when sending or receiving by facsimile. This is such a process described below. Namely, in the countries where the multiple-functional peripheral apparatuses 1 are installed, there is a country where it is an obligation to detect the tone signal when sending or receiving by facsimile (the tone signal can be detected in the multiple-functional peripheral apparatus 1 installed in the country) and a country where it is not an obligation (the tone signal cannot be detected in the multiple-functional peripheral apparatus 1 installed in the country). Thus, the information processing systems S in both of these countries are executed by the application software common to them.

As shown in a flowchart of FIG. 6A, in the initial function setting operation by the setup controller RM corresponding to the facsimile controller FX, at first the resource manager portion 66 is actuated (Step S1). Next, the setup controller RM containing the remote setup portion 58 is actuated (Step S2). Then, it is judged whether or not the tone signal detecting capability in the NCU 19 is already set and stored in the HDD device (Step S10). If it is stored (Step S10: YES), the operation flow proceeds to a step S15. If it is not stored (Step S10; NO), the facsimile check command data to check a presence or absence of the tone detecting capability is stored from the remote setup data driver 59 into the setup transmission buffer 61. After that, such a setup message Mr as "THERE IS TRANSMISSION DATA" is outputted to the resource manager portion 66. When receiving it, the resource manager portion 66 sends the facsimile check command data to the multiple-functional peripheral apparatus 1, and inquires whether the tone signal detecting capability is present or absent (Step S1). If the presence of the tone signal detecting capability is detected (Step S12; YES), the presence is stored into a predetermined file of the HDD device (Step S13). Next, a picture plane for the facsimile function setting, which contains a display to set the tone detection (refer to FIG.6B), is displayed on the screen of the display unit 34 on the basis of the inquired result (Step S15).

On the other hand, if the absence of the tone signal detecting capability in the NCU 19 is detected (Step S12: NO), the absence is stored into a predetermined file of the HDD device (Step S14). Next, a picture plane for the facsimile function setting which does not contain the display to set the tone detection (refer to FIG. 6C) is displayed on the screen of the display unit 34 on the basis of the inquired result (Step S15).

As shown in FIG.6B, if the presence of the tone signal detecting capability in the NCU 19 is detected (Step S12; YES), the picture plane to set the facsimile function, which contains a tone signal detection setting section 84 to set the tone detection, is displayed on the screen of the display unit 34 (Step S15). Alternatively, if the absence of the tone signal detecting capability in the NCU 19 is detected (Step S12; NO), the tone signal detection setting section 84 to set the tone detection is not displayed on the screen of the display unit 34 (refer to FIG.6C).

Incidentally, in FIG. 6B or 6C, a line type setting section 80 is intended to set the telephone line 24, which is used, to a dial line or a tone line. A speaker on/off setting section 81 is intended to set to turn on or off a speaker 22 in the multiple-functional peripheral apparatus 1. A line speed setting column 82 is intended to set to adapt a sending and receiving function in the multiple-functional peripheral apparatus 1 to a communication speed in the used telephone line 24. A speaker volume setting section 83 is intended to set a volume of the speaker 22. A confirmation ("OK") button 85 is a button to confirm the respective set values set on the screen, and a cancel ("CANCEL") button 86 is a button to cancel the respective set values set on the screen.

At a step S16, the function settings of the NCU 19 and the like are performed on the screen of the display unit 34. Then, when the confirmation button 85 is actuated by the mouse 32, the set command data corresponding to the set function is transmitted to the multiple-functional peripheral apparatus 1. Hence, after this, the facsimile operation corresponding to the pertinent function is performed in the facsimile function of the multiple-functional peripheral apparatus 1.

According to the second example of the initial function setting operation in the present embodiment, the function setting in relation to the NCU 19 can be performed from the personal computer 30 in the condition adapted to the presence or absence of the tone signal detecting capability in the NCU 19. Namely, it is possible to protect a user from being confused since the tone signal detection setting section 84 is displayed regardless of the absence of the tone signal detecting capability in the multiple-functional peripheral apparatus 1.

In the embodiment shown in FIGS. 6A, 6B and 6C, the setting operations for the tone signal detection capability (Steps S15 and S16) are performed following the initial function setting operation of inquiring the presence or absence of the tone signal detecting capability. However, it is naturally possible to change the setting content of the tone signal detection by actuating the setup controller RI after these setting operations, as the occasion demands. In this case, the presence or absence of the tone signal detecting capability may be inquired again to the multiple-functional peripheral apparatus 1, or it may be selected to display either of the display screens shown in FIGs.6B and 6C by record- ing the inquired result at the initial installation into a predetermined file in the HDD device and referring to the file content thereof later for the selection.

(VI) Third Initial Function Setting Operation

Finally, an example of the initial function setting operation corresponding to the printer controller PR is explained with reference to FIGS. 7A to 8B. This third example of the initial function setting operation shown in FIG. 7A is performed by the setup controller RM, and is performed only once immediately after the application software corresponding to the printer controller PR and the setup controller RM is installed into the HDD device of the external memory 33 or the like.

In this third example of the initial function setting operation, a set maximum value of a sleep time (which is a time between a time point when a recording operation on a final record sheet is ended and a time point when a heater for fixing toners is switched to an unused state (i.e. a low temperature state)) in the printer 15 of the multiple-functional peripheral apparatus 1 is inquired. This is such a process described below. Namely, in the countries where the multiple-functional peripheral apparatuses 1 are installed, there is a country where a limit is imposed on the maximum value of the sleep time (the maximum value of the sleep time is usually identical with the limit value in the multiple-functional peripheral apparatus 1 installed in the country) and a country where the limit is not imposed (the maximum value of the sleep time is not set in the multiple-functional peripheral apparatus 1 installed in the country). Thus, this process is performed in order to drive the information processing apparatuses S in both of these countries by using the application software common to them.

Figure 7B:
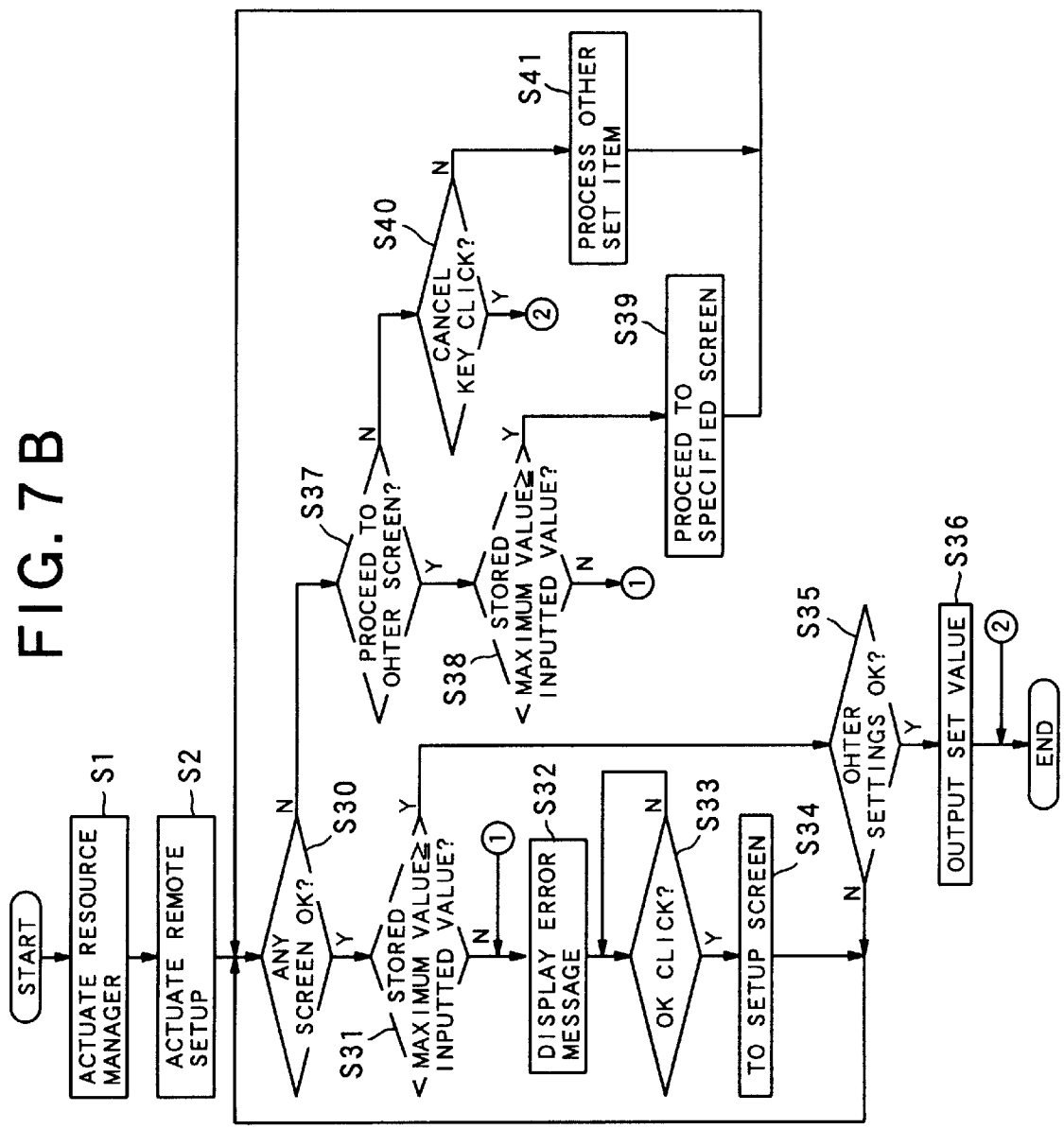
FIG. 7B is a flowchart showing a function setting operation after the initial function setting operation in FIG. 7A.
Figure 7A:
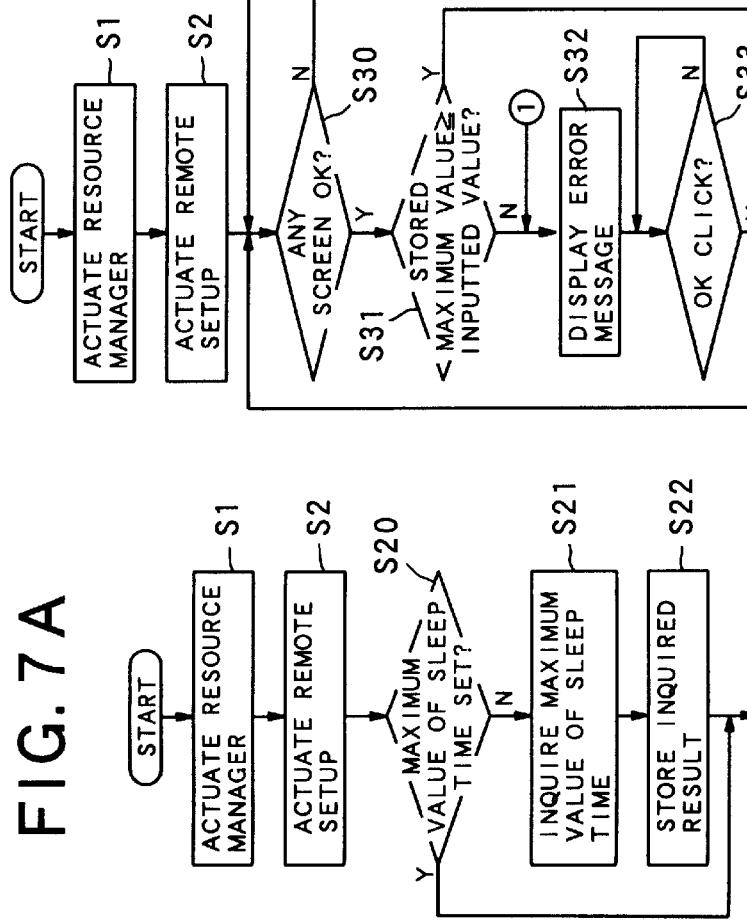
FIG. 7A is a flowchart showing a third example of the initial function setting operation of the embodiment.

As a premise of the process shown in FIGS. 7A and 7B, the maximum value of the sleep time which is preset in accordance with the situation of the country where the multiple-functional peripheral apparatus 1 is installed is assumed to be stored in the EEPROM 12 of the multiple-functional peripheral apparatus 1.

As shown in a flowchart of FIG. 7A, in the initial function setting operation by the setup controller RM in relation to the printer 15, at first the resource manager portion 66 is actuated (Step S1). Next, the setup controller RM containing the remote setup portion 58 is actuated (Step S2). Then, it is judged whether or not the setting of the maximum value of the sleep time in the printer 15 is already stored in the HDD device (Step S20). If it is stored (Step S20; YES), the process is ended while maintaining its original state. If it is not stored (Step S20; NO), the printer check command data to check the maximum value of the sleep time is stored into the setup transmission buffer 61. After that, such a setup message Mr as "THERE IS TRANSMISSION DATA" is outputted to the resource manager portion 66. When receiving it, the resource manager portion 66 sends the printer check command data to the multiple-functional peripheral apparatus 1, and inquires the maximum value of the sleep time (Step S21). Then, the maximum value of the sleep time is stored into a predetermined file of the HDD device on the basis of the inquired result of the maximum value of the sleep time (Step S22). Then, the process is ended.

Next, an actual function setting process in the setup controller RM after the initial function setting in the printer controller PR is ended is explained with reference to a flowchart of FIG.7B.

As shown in FIG.7B, at first, the resource manager portion 66 is actuated when a recording process is actually performed after the initial function setting is ended (Step S1). Next, the setup controller RM containing the remote setup portion 58 is actuated (Step S2).

Next, it is checked whether or not a confirmation button corresponding to "OK" is actuated on any one of the function setting display on the screen of the display unit 34 in relation to the printer control PR (Step S30). If the confirmation button corresponding to "OK" is actuated (Step S30; YES), it is judged whether or not the maximum value of the sleep time inputted on the screen (refer to FIG. 8A) corresponding to the function setting of the printer 15 in the multiple-functional peripheral apparatus 1 is smaller than the maximum value of the sleep time, which has been stored into the HDD device at the Step S22 (Step S31). Incidentally, on the screen shown in FIG. 8A, a mode setting section 90 is intended to select a record mode in the printer 15, a sleep time setting section 91 is intended to set and input the sleep time in the printer 15, a confirmation button 93 corresponding to "OK" is a button actuated when the set is completed, and a cancel button 94 corresponding to "CANCEL" is a button actuated when the set is canceled.

Figure 8A:
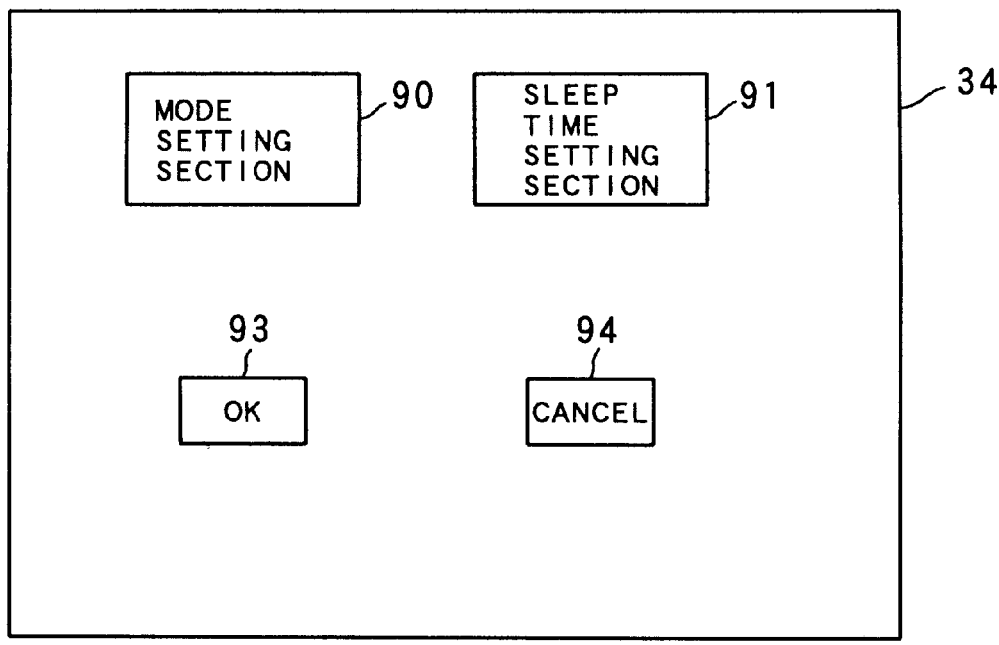
FIG. 8A is a plan view of the display screen showing one example of the picture plane according to the third example of the initial function setting operation.
Figure 8B:
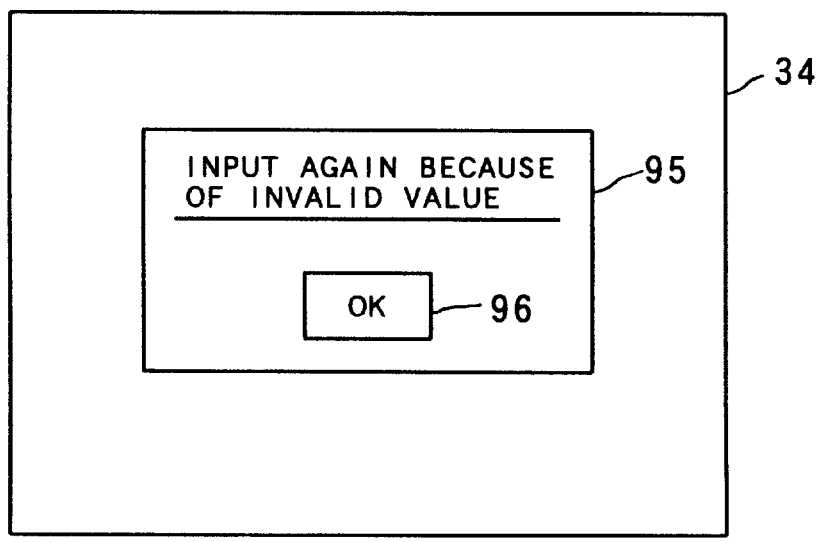
FIG. 8B is a plan view of the display screen showing one example of the picture plane for error information and reset information according to the third example of the initial function setting operation.

If the inputted maximum value of the sleep time is larger than the maximum value of the sleep time stored in the HDD device in the judgment at the step S31 (Step S31; NO), the error information indicating that the inputted maximum value of the sleep time is not appropriate and the re-setting information indicating that the maximum value of the sleep time should be inputted (set) again are displayed on the screen of the display unit 34. In these displays of the error information and the re-setting information, for example, a message 95 of "INPUT AGAIN BECAUSE OF INVALID VALUE" and a confirmation button 96 corresponding to "OK" to confirm the message are simultaneously displayed as shown in FIG.8B.

If the error information and the re-setting information are displayed at the step S32, it is next judged whether or not the confirmation button 96 corresponding to "OK" is clicked on the screen of the display unit 34 (Step S33). If it is not clicked (Step S33; NO), the operation flow waits until it is clicked. If it is clicked (Step S33; YES), the operation flow returns to the original setup screen (i.e., the picture plane immediately after the remote setup portion 58 is actuated), and then returns to the step S30 so as to reset the function settings including the re-input of the maximum value of the sleep time (Step S34).

If the inputted maximum value of the sleep time is equal to or smaller than the maximum value of the sleep time stored in the HDD device in the judgment at the step S31 (Step S31; YES), the inputted maximum value is determined as a value within an appropriate range. Then, it is judged whether or not the function settings in other setting items (refer to FIG. 8A) are appropriate (Step S35). If they are not appropriate (Step S35; NO), the operation flow returns to the step S30 so as to perform again these function settings. If they are appropriate (Step S35; YES), it is determined that the function settings are completed, and the setting values are outputted to the multiple-functional peripheral apparatus 1 (Step S36), and then the function setting process is ended. After that, the recording process of the information onto the record sheet is performed by the printer 15 in the multiple-functional peripheral apparatus 1, and the control operation of the sleep time is executed in accordance with the setting values.

On the other hand, if the confirmation button corresponding to "OK"is not actuated (Step S30; NO) in the judgment at the step S30, it is determined that the function settings are not completed. Then, it is judged according to the input of the mouse 32 whether or not the operation is proceeded to any other function setting picture plane on the screen (Step S37). If it is proceeded (Step S37; YES), the operation is proceeded again to the picture plane on the screen corresponding to the function setting for the printer 15 (refer to FIG. 8A). Then, it is judged whether or not the maximum value of the sleep time inputted again on the screen is smaller than the maximum value stored in the HDD device (Step S38). If the maximum value of the inputted sleep time is larger than the maximum value stored in the HDD device (Step S38; NO), it is determined that the inputted maximum value of the sleep time is not appropriate, and the operation flow proceeds to the step S32, and then the error information and the like are displayed. After this, the above mentioned operations are executed (Steps S33 and S34).

If the inputted maximum value of the sleep time is equal to or smaller than the maximum value stored in the HDD device in the judgment at the step S38 (Step S38; YES), it is determined that the inputted maximum value is appropriate, and then the operation proceeds to the picture plane specified at the step S37 (Step S39), and the operation flow proceeds to the step S30 so as to perform the function settings.

Moreover, if the operation does not proceed to any other function setting picture planes in the judgment at the step S37 (Step S37; NO), it is judged whether or not a cancel button 94 corresponding to "CANCEL" (refer to FIG. 8A) indicating that the function settings are ended (Step S40) is clicked. If it is clicked (Step S40; YES), the function setting process is ended as it is. If it is not clicked (Step S40; NO), after other setting processes on the screen are performed (Step S41), the operation flow returns to the step S30 so as to display other function setting picture planes to thereby perform the function settings.

According to the third example of the initial function setting operation, it is possible to perform the function setting corresponding to the sleep time of the heater set at the printer 15 from the personal computer 30. Moreover, if a sleep time, which is unsuitable for the sleep time which is preset in the printer 15 and is stored in the HDD device, is set, the error information and the reset information are displayed. Thus, it is possible to recognize the unsuitable condition and also possible to quickly perform the re-setting.

Each of the scanner message Ms, the printer message Mp and the facsimile message Mf shown in FIG.4 indicates the message of "THERE IS TRANSMISSION DATA" or "THERE IS RECEPTION DATA" which is transmitted in case that the data is to be transmitted and received through each buffer between the resource manager portion 66 and the scanner driver 51, between the resource manager portion 66 and the printer driver 55 and between the resource manager portion 66 and the facsimile driver 63, respectively.

As explained above, according to the respective examples of the initial function setting process, the function settings for the sake of the information processes in the personal computer 30 are performed in accordance with the inquired results through the resource manager portion 66 as for the information processing functions in the multiple-functional peripheral apparatus 1. Hence, the function settings can be performed from the personal computer 30 in harmonization with the information processing functions in the multiple-functional peripheral apparatus 1.

Even if the specifications and the like for the information processing functions in the multiple-functional peripheral apparatus 1 are changed, it is possible to adapt the information processing functions in the multiple-functional peripheral apparatus 1 to the function settings in the personal computer 30.

Moreover, since the content of the function settings are stored in the HDD device, it is not necessary to perform again the inquiry and the function settings once the function settings are performed.

The application programs to perform the embodiment can be recorded on the record medium, such as the flexible disk 41, a CD-ROM (Compact Disk-Read Only Memory) or the like. Thus, the present application is not limited to the personal computer 30. For example, the present invention can be applied to any kind of computer, as long as it can execute the application program.

Further, the cases where the multiple-functional peripheral apparatus 1 is remotely controlled from the personal computer 30 are explained in the embodiment. However, the present invention is not limited to this. For example, the present invention can be widely applied to a case where another information processing apparatus is controlled from a computer, and then the function settings are performed in another information processing apparatus.

Furthermore, the embodiment is related to the multiple-functional peripheral apparatus 1, which integrally comprises the scanner 14, the printer 15 and the facsimile functioning portion composed of the NCU 19 etc., and also the embodiment is intended to be unitarily managed from the personal computer 30 with the functions such as the scanner 14 and the like as the peripheral apparatus. However, the present invention is not limited to this. For example, the present invention can be applied to the information processing system which comprises a peripheral apparatus singly composed of a scanner, a printer, a facsimile or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information processing system comprising a first information processing apparatus and a second information processing apparatus, which are connected to each other, for performing an information process by controlling, from said first information processing apparatus, said second information processing apparatus to perform the information process, said information processing system comprising:

an inquiring device contained in said first information processing apparatus for inquiring an information processing function in said second information processing apparatus of said second information processing apparatus, in advance of performing the information process; and a function setting device contained in said first information processing apparatus for performing a function setting for the information processing function in said second information processing apparatus from said first information processing apparatus when performing the information process, on the basis of an inquired result by said inquiring device, wherein said function setting device comprises:

a providing device for providing a user with information which indicates a content of the function setting on the basis of the inquired result, so as to enable the user to give an instruction to perform the function setting to said first information processing apparatus; and a function setting execution device for performing the function setting on the basis of the instruction given by the user.

2. An information processing system according to claim 1, further comprising a memory device contained in said first information processing apparatus for storing a content of the function setting, and performing the information process by controlling said second information processing apparatus from said first information processing apparatus on the basis of the stored content of the function setting.

3. An information processing system according to claim 1, wherein:

said second information processing apparatus comprises a scanner device for reading information;

said first information processing apparatus comprises a computer for processing the information read by said scanner device;

the information processing function in said second information processing apparatus is an information reading function of said scanner device; and the function setting for the information processing function corresponds to a setting of a reading capability of the information reading function.

4. An information processing system according to claim 3, wherein said inquiring device inquires the information processing function of said second information processing apparatus only once, before performing the information process.

5. An information processing system according to claim 3, wherein said providing device provides the user with information which indicates the reading capability of the information reading function.

6. An information processing system according to claim 1, wherein:

said second information processing apparatus comprises a communicating device connected through a telephone line to an external device for sending and receiving information to and from the external device;

said first information processing apparatus comprises a computer for performing a process of sending and receiving the information;

the information processing function in said second information processing apparatus is a detecting function for detecting a tone signal inputted through said telephone line of said communicating device; and the function setting for the information processing function corresponds to a setting of a presence or absence of the detecting function.

7. An information processing system according to claim 6, wherein said inquiring device inquires the information processing function of said second information processing apparatus only once, before performing the information process.

8. An information processing system according to claim 6, wherein said providing device provides the user with information which indicates the presence or absence of the detecting function.

9. An information processing system according to claim 1, wherein:

said second information processing apparatus comprises a printer device for heating and fixing toners transferred on a record sheet corresponding to information to be recorded by using a heater to thereby record the information;

said first information processing apparatus comprises a computer for performing a process of outputting to said second information processing apparatus the information to be recorded;

the information processing function in said second information processing apparatus is a switching function for switching said heater in said printer device to an unused state; and the function setting for the information processing function corresponds to a setting of a switching timing when said heater is switched to the unused state by the switching function.

10. An information processing system according to claim 9, wherein:

said second information processing apparatus comprises a timing information memory device for storing preset switching timing information indicative of the switching timing; and said first information processing apparatus outputs error information when the switching timing, which is inconsistent with the stored switching timing information, is set in the function setting and further outputs re-setting information to prompt a re-setting of the switching timing in said first information processing apparatus.

11. An information processing system according to claim 9, wherein said inquiring device inquires the information processing function of said second information processing apparatus only once, before performing the information process.

12. An information processing system according to claim 9, wherein said providing device provides the user with information which indicates the switching timing.

13. An information processing system according to claim 1, wherein said providing device provides the user with a plurality of items or values which indicate the information processing function of said second information processing apparatus, so as to enable the user to select one or some of the plurality of items or values.

14. An information processing system according to claim 1, wherein said providing device comprises a display device for displaying the information which indicates the content of the function setting.

15. A program storage device readable by a computer in an information processing system comprising said computer and an information processing apparatus, which are connected to each other, for performing an information process by controlling, from said computer, said information processing apparatus to perform the information process, tangibly embodying a program of instructions executable by said computer to perform method processes for performing the information process, said method processes comprising:

inquiring an information processing function in said information processing apparatus of said information processing apparatus, in advance of performing the information process, by an inquiring device contained in said computer; and performing a function setting for the information processing function in said information processing apparatus from said computer when performing the information process, on the basis of an inquired result by said inquiring device, by a function setting device contained in said computer, wherein said function setting process comprises the processes of:

providing a user with information which indicates a content of the function setting on the basis of the inquired result, so as to enable the user to give an instruction to perform the function setting to said first information processing apparatus; and performing the function setting on the basis of the instruction given by the user.

16. A program storage device according to claim 15, wherein said method processes further comprise:

storing a content of the function setting into a memory device contained in said computer; and performing the information process by controlling said information processing apparatus from said computer on the basis of the stored content of the function setting.

17. A program storage device according to claim 15, wherein:

said information processing apparatus comprises a scanner device for reading information;

said computer processes the information read by said scanner device;

the information processing function in said information processing apparatus is an information reading function of said scanner device; and the function setting for the information processing function corresponds to a setting of a reading capability of the information reading function.

18. A program storage device according to claim 17, wherein said inquiring process inquires the information processing function of said information processing apparatus only once, before performing the information process.

19. A program storage device according to claim 17, wherein said providing process provides the user with information which indicates the reading capability of the information reading function.

20. A program storage device according to claim 15, wherein:

said information processing apparatus comprises a communicating device connected through a telephone line to an external device for sending and receiving information to and from the external device;

said computer performs a process of sending and receiving the information;

the information processing function in said information processing apparatus is a detecting function for detecting a tone signal inputted through said telephone line of said communicating device; and the function setting for the information processing function corresponds to a setting of a presence or absence of the detecting function.

21. A program storage device according to claim 20, wherein said inquiring process inquires the information processing function of said information processing apparatus only once, before performing the information process.

22. A program storage device according to claim 20, wherein said providing process provides the user with information which indicates the presence or absence of the detecting function.

23. A program storage device according to claim 15, wherein:

said information processing apparatus comprises a printer device for heating and fixing toners transferred on a record sheet corresponding to information to be recorded by using a heater to thereby record the information;

said computer performs a process of outputting to said information processing apparatus the information to be recorded;

the information processing function in said information processing apparatus is a switching function for switching said heater in said printer device to an unused state; and the function setting for the information processing function corresponds to a setting of a switching timing when said heater is switched to the unused state by the switching function.

24. A program storage device according to claim 23, wherein the method processes further comprise:

storing preset switching timing information indicative of the switching timing into a timing information memory device contained in said information processing apparatus;

outputting error information by said computer when the switching timing, which is inconsistent with the stored switching timing information, is set in the function setting; and outputting re-setting information to prompt a re-setting of the switching timing in said computer by said computer.

25. A program storage device according to claim 23, wherein said inquiring process inquires the information processing function of said information processing apparatus only once, before performing the information process.

26. A program storage device according to claim 23, wherein said providing process provides the user with information which indicates the switching timing.

27. A program storage device according to claim 15, wherein said providing process provides the user with a plurality of items or values which indicate the information processing function of said second information processing apparatus, so as to enable the user to select one or some of the plurality of items or values.

28. A program storage device according to claim 15, wherein said providing process comprises the process of displaying the information which indicates the content of the function setting.

* * * * *